(12) United States Patent
Thayer

(10) Patent No.: US 9,984,051 B2
(45) Date of Patent: May 29, 2018

(54) HIERARCHICAL IDENTIFIERS FOR HTML ELEMENTS

(71) Applicant: CA, Inc., New York, NY (US)

(72) Inventor: Kyle Lee Joseph Thayer, Windsor, CO (US)

(73) Assignee: CA, Inc., New York, NY (US)

( * ) Notice: Subject to any disclaimer, the term of this patent is extended or adjusted under 35 U.S.C. 154(b) by 160 days.

(21) Appl. No.: 15/053,846

(22) Filed: Feb. 25, 2016

(65) Prior Publication Data

US 2017/0249287 A1    Aug. 31, 2017

(51) Int. Cl.
*G06F 17/00* (2006.01)
*G06F 17/22* (2006.01)
*G06F 17/27* (2006.01)
*G06F 17/30* (2006.01)

(52) U.S. Cl.
CPC ...... *G06F 17/2247* (2013.01); *G06F 17/2725* (2013.01); *G06F 17/22* (2013.01); *G06F 17/30896* (2013.01); *G06F 17/30905* (2013.01); *G06F 17/30961* (2013.01)

(58) Field of Classification Search
CPC .............. G06F 17/2247; G06F 17/22; G06F 17/30896; G06F 17/30961; G06F 9/4443
See application file for complete search history.

(56) References Cited

U.S. PATENT DOCUMENTS

| 7,769,773 | B1 * | 8/2010 | Doubek | G06F 17/30914 707/769 |
| 2012/0110437 | A1 * | 5/2012 | Pan | G06F 17/30902 715/235 |

* cited by examiner

*Primary Examiner* — Quoc A Tran
(74) *Attorney, Agent, or Firm* — Gilliam IP PLLC

(57) ABSTRACT

Elements within HTML based applications may be logically related; however, HTML does not have built-in support for indicating these relationships, such as parent-child relationships. Instead, relationships among HTML elements are not utilized or are incorrectly inferred based on nesting of HTML elements within an HTML document. As a result, when creating a DOM for an HTML document, the hierarchy of elements in the DOM tree is based on coded locations of elements within the HTML document rather than logical relationships among elements. To allow for indication of logical relationships, a hierarchical identifier attribute may be used in conjunction with the HTML id attribute. For example, two elements may include a hierarchical identifier of "person" with base identifiers of "name" and "address".

20 Claims, 5 Drawing Sheets

HIERARCHICAL IDENTIFIERS FOR HTML ELEMENTS

BACKGROUND

The disclosure generally relates to the field of computer systems, and more particularly to organization and identification of web page elements.

HyperText Markup Language ("HTML") is used along with Cascading Style Sheets ("CSS") and JavaScript to create web pages. HTML includes elements, such as paragraphs and images (indicated with the tags <p> and <img>, respectively), that form the building blocks of web pages. These elements may include attributes that consist of key value pairs. For example, a paragraph element may include an "id" attribute indicated as <p id="example"> where "id" is the key and "example" is the value. The id attribute is a document-wide unique identifier for an element and is used to identify the element so that style sheets such as CSS and scripts may reference the element to modify the appearance of or otherwise alter the element.

When a web page is loaded, a web browser creates a Document Object Model ("DOM") that represents the web page. The DOM is a tree of objects that includes the HTML elements. The DOM allows programming languages such as JavaScript to reference, access, change, add, or delete HTML elements in the web page.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to HTML in illustrative examples. But aspects of this disclosure can be applied to other programming languages and markup languages such as Extensible Markup Language ("XML"), Extensible HyperText Markup Language ("XHTML"), etc. In other instances, well-known instruction instances, protocols, structures and techniques have not been shown in detail in order not to obfuscate the description.

Overview

Elements within HTML based applications may be logically related; however, HTML does not have built-in support for indicating these relationships, such as parent-child relationships. Instead, relationships among HTML elements are not utilized or are incorrectly inferred based on nesting of HTML elements within an HTML document. As a result, when creating a DOM for an HTML document, the hierarchy of elements in the DOM tree is based on coded locations of elements within the HTML document rather than logical relationships among elements. To enable indication of logical relationships, a hierarchical identifier attribute may be used in conjunction with an HTML id attribute. For example, two elements may include a hierarchical identifier of "person" with base identifiers of "name" and "address". These elements may be written as <input hid="person" id="name"> and <input hid="person" id="address">. The relationship among the "name" and "address" elements is apparent as the elements share the hierarchical identifier of "person".

EXAMPLE ILLUSTRATIONS

Figure 1:
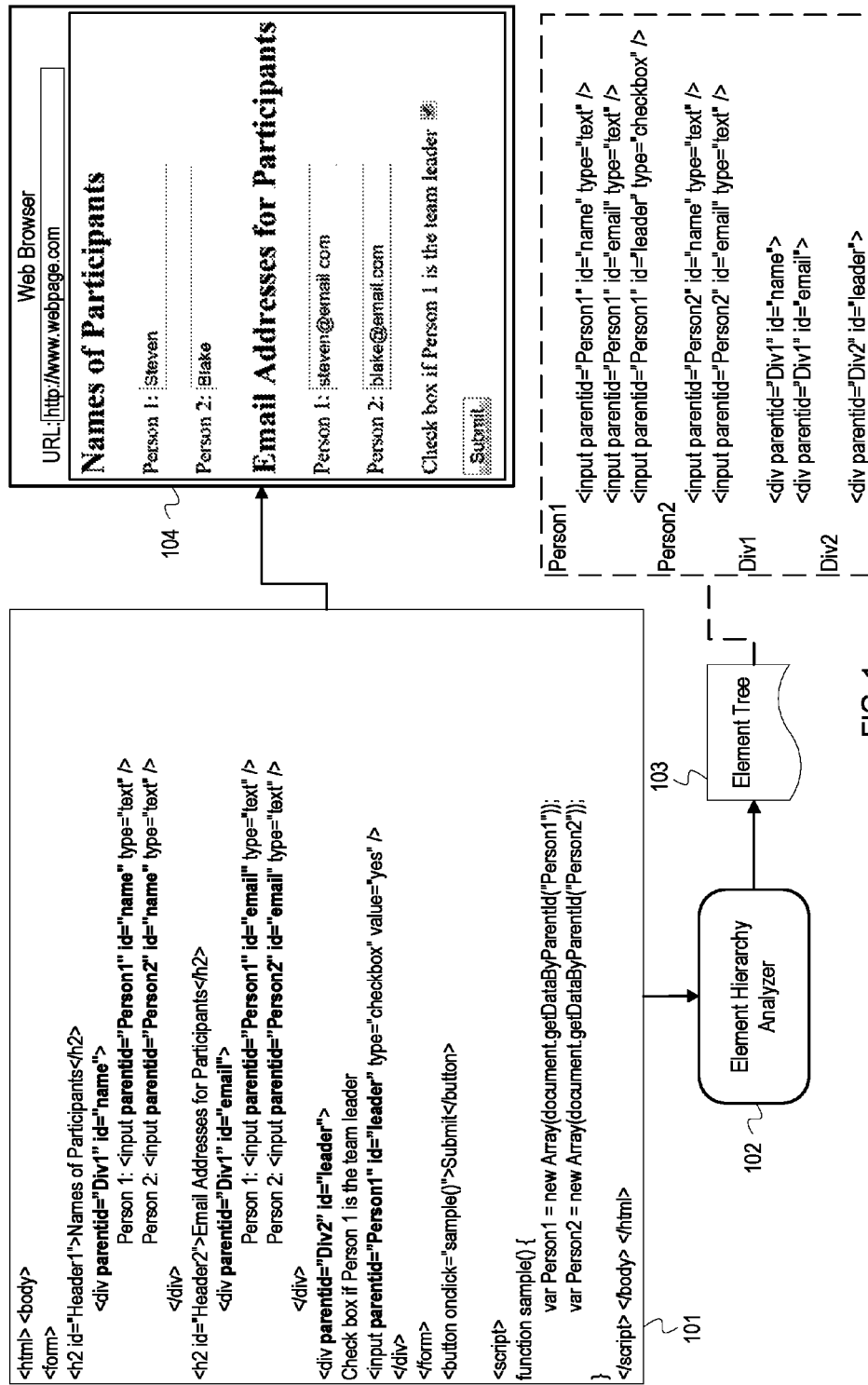
FIG. 1 depicts an example HTML document that incorporates a hierarchical identifier attribute to indicate relationships among elements.

FIG. 1 depicts an example HTML document that incorporates a hierarchical identifier attribute to indicate relationships among elements. FIG. 1 depicts example HTML code 101 ("code 101"), an element hierarchy analyzer 102, and a web browser 104.

The web browser 104 displays an example web page based on the code 101. The web browser 104 may be any web browser capable of rendering and displaying the code 101. The web page displayed by the web browser 104 is a possible rendering of the code 101 which is depicted for illustration purposes. The code 101 includes standard HTML elements and an embedded JavaScript function "sample( )" As illustrated in FIG. 1, the web page displayed by web browser 104 depicts HTML elements such as five input elements which are indicated in the code 101: four text boxes and one checkbox. The web page also depicts headings, text, and a "Submit" button which are indicated in the code 101.

As indicated by the bold typeface, some elements in the code 101 include a hierarchical identifier and identifier attribute pair. For example, the first "div" element has a hierarchical identifier of "Div1" and an identifier of "name." In FIG. 1, a hierarchical identifier is referred to as a parent identifier. The parent identifier is an example of a hierarchical identifier attribute that is used to indicate a single-level, parent-child relationship. The parent identifier is used as a supplement to the standard HTML identifier attribute to indicate a relationship among a set of elements. Relationships cannot be indicated using the standard identifier attribute alone as HTML requires the standard identifier to be globally unique within a document. In contrast to the standard identifier, the parent identifier may be assigned to multiple elements. The use of the parent identifier allows related elements in the code 101 to be readily identifiable. For example, in FIG. 1, the parent identifier "Person1" is assigned to three input elements. As a result, a browser or an application or function processing the code can identify the shared identifier among the three input elements and ascertain that the elements are related.

Use of the parent identifier in HTML code such as the code 101 should follow syntax rules to enhance the functionality and reliability of the parent identifier. For example, if a parent identifier attribute is present in an element, then the standard HTML identifier attribute (hereinafter referred to as a "base identifier") should also be present in an element, as a parent identifier supplements but does not replace the base identifier. Using a parent identifier in an element without the base identifier can cause difficulties when attempting to refer to the element from elsewhere in a document or from a JavaScript function, for example.

Additionally, the parent identifier and base identifier should be combinatorially unique throughout the code 101, i.e. the parent/base identifier pair combination should be unique. For example, in FIG. 1, the first input element has a parent identifier of "Person1" and a base identifier of "name," so another element cannot also have a parent identifier of "Person1" and a base identifier of "name." Because the parent and base identifier need only be unique in combination, the standard HTML rule that a base identifier should be globally unique is effectively complied with. For example, in FIG. 1, the first input element has a parent identifier of "Person1." and a base identifier of "name," and the second input element has a parent identifier of "Person2" and the same base identifier of "name." Although the base identifier is not globally unique, the parent/base identifier pair is globally unique. In some implementations, however, the standard HTML rule that a base identifier be globally unique may still be enforced to prevent confusion with elements if a parent identifier is not used. Alternatively, the rule may be modified to only require global uniqueness for the base identifier in instances where a parent identifier is not used, such as the first header element "h2" in FIG. 1 which includes a base identifier but no parent identifier.

The JavaScript function "sample( )" included in the code 101 is triggered in response to clicking the "Submit" button element within the webpage displayed by the browser 104. The function illustrates one possible use of the parent identifier attribute. The function declares an array "Person1" to be equal to all elements with the parent identifier "Person1" and an array "Person2" to be equal to all elements with the parent identifier "Person2." The "Person1" array includes the three input elements with the parent identifier "Person1" and base identifiers "name," "email," and "leader." The "Person2" array includes the two input elements with the parent identifier "Person2" and base identifiers "name" and "email." The array declarations are accomplished through the use of a "document.getDataByParentId( )" application programming interface ("API") function call, which may be added to the JavaScript API to utilize parent identifiers. The getDataByParentId( ) function returns all elements with the parent identifier that is passed to the function. Although not depicted, the sample( ) function may perform operations other than declaring arrays. For example, the sample( ) function may be used to extract values from the input fields and populate them into a database. Additionally, the sample( ) function may validate data in the input fields. If the data for "Person2" did not successfully validate, the sample( ) function may, for example, retrieve elements with the "Person2" parent identifier and highlight the elements red to indicate an error.

The element hierarchy analyzer 102 generates the element tree 103 using the parent identifiers in the code 101. The element tree 103 depicts logical relationships of elements in the code 101 independent of the DOM for the code 101. For example, in the DOM for the code 101, the first two input elements (elements with the base identifier "name") appear to be related as the input elements are wrapped within the div element tag with the similar base identifier "name." However, using the parent identifiers, the element hierarchy analyzer 102 determines that the first two input elements are not related to each other and, as depicted in the element tree 103, are in fact logically related to other elements in the code 101. The element tree 103 may be processed by a code development tool to quickly identify related elements within the code 101. Additionally, the element tree 103 may be used by an application, such as a web page editor or what you see is what you get ("WYSIWYG") web editor, to graphically display related elements and allow a user to more easily identify and edit related elements.

In FIG. 1, the parent identifier attribute is indicated as "parentid" as an example. The parent identifier attribute may be indicated as any series of alphanumeric characters such as "pid", id1", etc.

Figure 2:
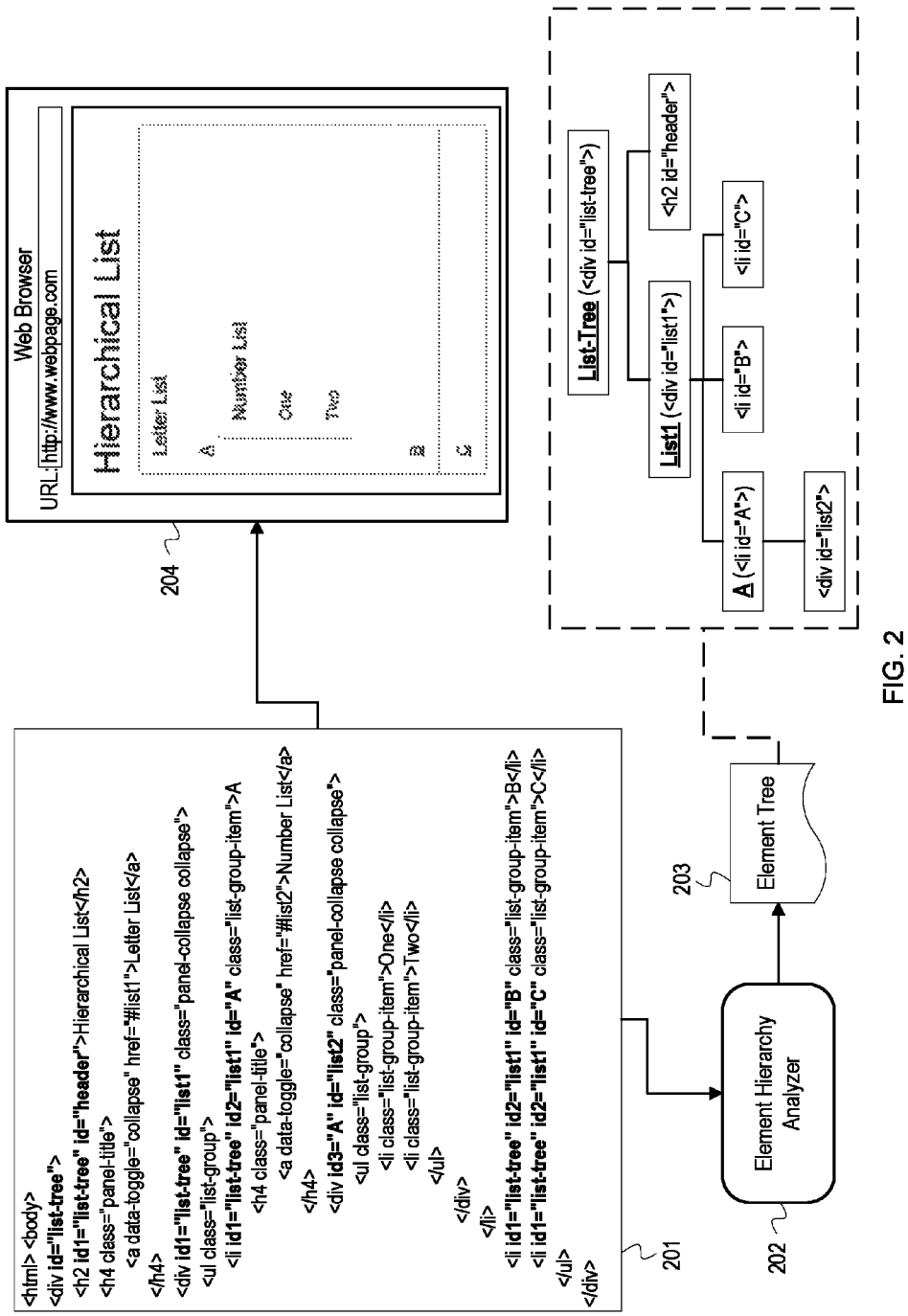
FIG. 2 depicts an example HTML document that incorporates a hierarchical identifier attribute to indicate relationships among elements.

FIG. 2 depicts an example HTML, document that incorporates a hierarchical identifier attribute to indicate relationships among elements. FIG. 2 depicts example HTML code 201 ("code 201"), an element hierarchy analyzer 202 ("analyzer 202"), and a web browser 204.

Similar to the web browser 104 of FIG. 1, the web browser 204 depicts an example rendering of a web page based on the code 201. The web page depicts a hierarchical list. The hierarchical list includes a top-level list entitled "Letter List" with child elements "A", "B", and "C". The element "A" is a parent of a list entitled "Number List" which includes child elements "One" and "Two".

The code 201 uses hierarchical identifiers to indicate hierarchical relationships among the HTML elements in the code 201. The parent identifier in FIG. 1 is a simple hierarchical identifier that allows for indication of a single hierarchical level, i.e. one parent identifier and one child identifier. The hierarchical identifiers of FIG. 2 may be used to indicate an element's location or position in a hierarchy that has multiple levels. The key for a hierarchical identifier attribute and the hierarchical identifier itself may be used to determine an element's hierarchical location. For example, the second "div" element in the code 201 includes a hierarchical identifier attribute of "id1='list-tree'". The "id1" key indicates an identifier that is a top-most level of the hierarchy. The hierarchical identifier "list-tree" corresponds to the base identifier attribute of "id='list-tree'" for the first "div" element. Based on the attribute key and the hierarchical identifier, it can be determined that the second "div" element is a child of the first "div" element. Subsequent hierarchical identifiers may be indicated with successively numbered attribute keys such as "id2", "id3", "id4", etc. For example, the first list element with the tag "li" includes hierarchical identifier attributes of "id1='list-tree'" and "id2='list1'". Based on these attribute keys and hierarchical identifiers, it can be determined that the "li" element is two levels down in the hierarchy and is a child of the second "div" element and the first "div" element.

The analyzer 202 generates an element tree 203 based on the hierarchical identifiers in the code 201. The analyzer 202 processes each element which contains one or more identifiers and determines the element's location in the element tree 203 based on the identifiers. The first element which has an identifier is the first "div" element with the identifier "list-tree". Since only a base identifier is used, the analyzer 102 determines that the element "div" is a top-level element and places it at the top of the element tree 203. In some implementations, the analyzer 202 may not place elements which only have a base identifier in the element tree 203 until a corresponding child element is discovered. In FIG. 2, the first "div" element has two child elements as indicated by the hierarchical identifier attributes of "id1='list-tree'" in the "h2" element and the second "div" element. These elements are placed as tree nodes below the first "div" element in the element tree 203. The analyzer 202 further determines that the second "div" element with the identifier "List1" has three children elements and places those as tree nodes below "List1" in the element tree 203. Similarly, the analyzer 202 determines that the "div" element with the identifier "List2" is a child of the list ("li") element with the identifier "A" and places the "div" element in the element tree 203 accordingly.

The "div" element with the identifier "List2" differs from the other elements with hierarchical identifiers in that the "div" element only includes the hierarchical identifier for its immediate parent. Even though the full hierarchy is not indicated, the analyzer 202 can still determine the hierarchical location of the "div" element using the identifier for the immediate parent. However, the analyzer 202 may traverse the element tree 203 to determine higher level parent elements as needed. For example, the analyzer 202 may use the hierarchical identifier for the immediate parent to retrieve the immediate parent element and obtain additional hierarchical identifiers.

The syntax rules described in FIG. 1 similarly apply to the use of hierarchical identifiers in FIG. 2. If a hierarchical identifier is associated with an element, then a base identifier should also be associated with the element. Additionally, each hierarchical identifier and base identifier pair should be unique in combination throughout the code 201. This rule applies throughout the hierarchy levels. For example, if a first element has a hierarchical/base identifier pair of id1="test1" and id="foo" and a second element has a hierarchical/base identifier pair id2="test1" and id="foo", these hierarchical/base identifier pairs are not unique even though the tags of the hierarchical identifiers indicate different levels in the hierarchy. By maintaining unique identifier pairs throughout the hierarchy, an element that is multiple levels deep in the hierarchy can be referenced individually without knowing the identifier for the element's immediate parent. For example, the element in the code 201 of "<li id1="list-tree" id2="list1" id="B" class="list-group-item">" can be referenced using the top-level identifier "list-tree" and the base identifier "B".

Although not depicted in FIG. 2, JavaScript code may utilize the hierarchical identifiers to retrieve elements based on their location in the element tree 203. For example, a script may use an API function document.getElementByHierarchyID ("List1") to retrieve children elements with a hierarchical identifier of "List1". If executed on the code 201, the function may return the "A", "B", "C" list elements and the "List2" element. The API function may also allow a user to specify how many levels of children to retrieve. In the previous example, the API function may be modified to be document.getElementByHierarchyID ("List1", 1) to retrieve only the direct children elements with a hierarchical identifier of "List1", i.e. to retrieve only the "A", "B", "C" list elements. When retrieving the elements, the script may traverse the element tree 203 to identify elements to be retrieved or may generate a new element tree or portions of an element tree on-the-fly in order to satisfy the request for elements.

Figure 3:
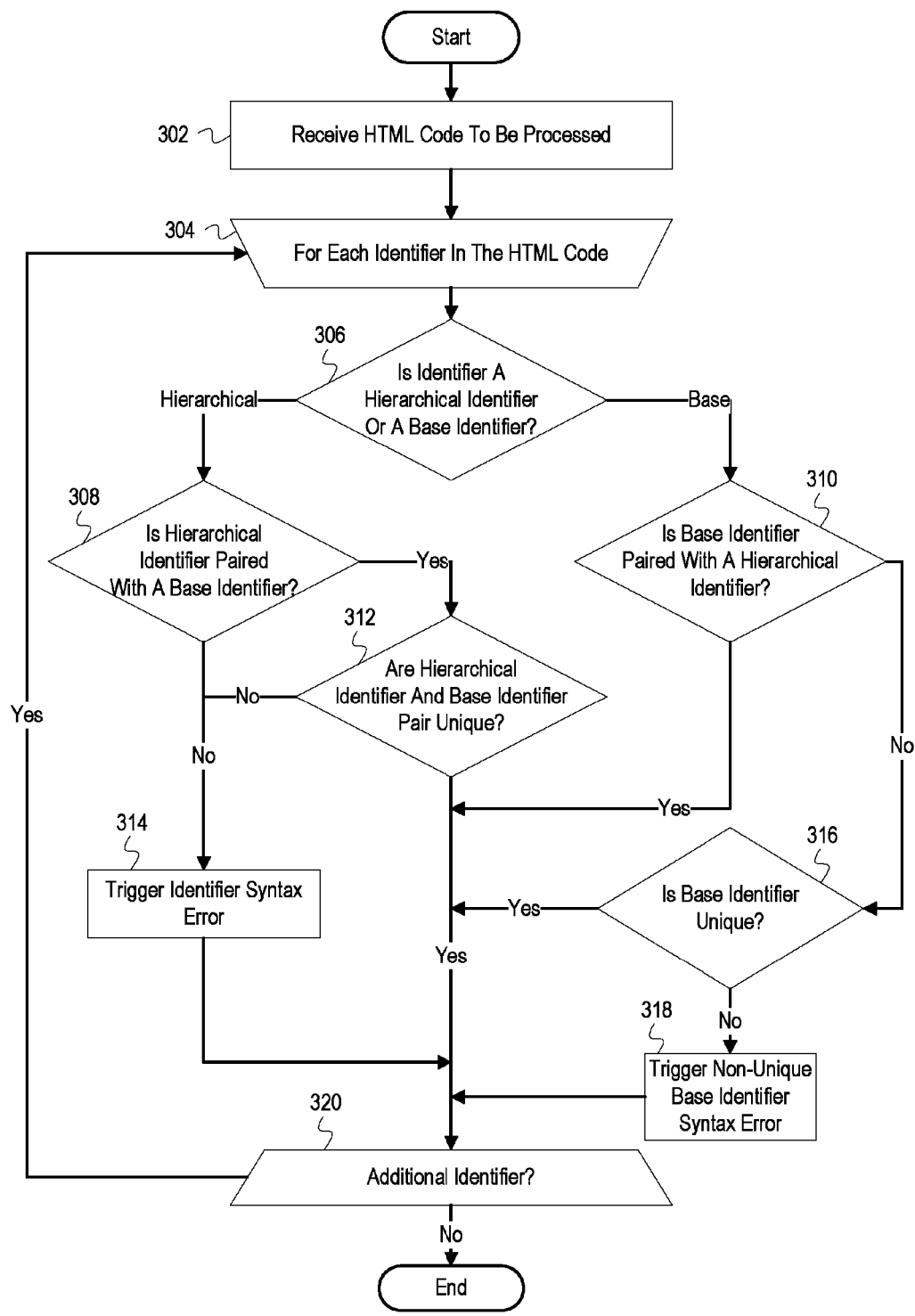
FIG. 3 depicts a flowchart that illustrates example operations for determining whether identifiers in an HTML document comply with syntax rules.

FIG. 3 depicts a flowchart that illustrates example operations for determining whether identifiers in an HTML document comply with syntax rules. The operations are described below as being performed by a compiler for illustration purposes. The operations may also be performed by a rendering engine of a web browser, a debugger, an integrated development environment or components thereof, etc.

A compiler receives HTML code to be processed (302). The compiler may receive the code as a result of navigation in a web browser to a uniform resource locator ("URL") for an HTML document, a user supplying an HTML document to the compiler, or as part of compiling a program or application that includes HTML code. The compiler may process the code by compiling the code, rendering the code, debugging the code, etc. As part of processing the HTML document, the compiler may generate an array of tokens or may parse the HTML code to generate a parse tree. The array of tokens includes symbols or words, such as an element tag or attribute key, identified in the code in accordance with the code's syntax or grammar. The parse tree may be constructed using the array of tokens and contains the element tags and indicates any attributes corresponding to each element.

The compiler begins operations for analyzing identifiers in the HTML code (304). The compiler analyzes the identifiers to ensure that the use of the identifiers complies with syntax rules as described in more detail below. The compiler may iterate through identifier attributes by searching the HTML code for identifier attribute keys, traversing a parse tree, or searching the array of tokens created as part of processing the HTML code. The identifier currently being analyzed is hereinafter referred to as the selected identifier.

The compiler determines whether the selected identifier is a hierarchical identifier or a base identifier (306). The compiler may analyze the attribute which contains the selected identifier and determine the key therefrom. For example, the compiler may analyze an attribute of "id2=names" to identify the key "id2". Using the key, the compiler can determine the type of the selected identifier. If the key is simply "id", the analyzer may determine that the selected identifier is a base identifier. If the key is "parentid" or an "id" with a number such as "id2", the analyzer may determine that the selected identifier is a hierarchical identifier.

If the compiler determines that the selected identifier is a hierarchical identifier, the compiler determines whether the hierarchical identifier is paired with a base identifier (308). As described above, if a hierarchical identifier attribute is associated with an element, then a base identifier attribute should also be associated with an element. Even if multiple hierarchical identifiers are associated with an element, a base identifier should be used to prevent ambiguity with other elements. For example, two elements with the same hierarchical identifier attributes such as id1="foo" and id2="foobar" and no based identifiers would be indistinguishable based on their hierarchical identifiers alone. As a result, the elements should have base identifiers that allow the two elements to be distinguished and referenced individually. To determine whether a base identifier is paired with the selected hierarchical identifier, the compiler may identify the element associated with the selected hierarchical identifier and determine whether the element also includes a base identifier attribute. In some implementations, the compiler may traverse a parse tree or search adjacent tokens in an array to determine if a paired base identifier exists.

If the compiler determines that the selected identifier is paired with a base identifier at block 308, the compiler determines whether the hierarchical identifier and base identifier pair are unique (312). The hierarchical identifier and base identifier should be globally unique in combination, i.e. the hierarchical/base identifier pair should be unique throughout the HTML document. For example, a hierarchical/base identifier pair of id1="test1" and id="name" is unique even if another hierarchical/base identifier pair shares either one of the hierarchical identifier or base identifier, such as id1="test2" and id="name". As the compiler processes identifiers, the compiler may maintain a list of hierarchical/base identifier pairs and check additional hierarchical/base identifier pairs against the list of already processed identifier pairs. If the selected hierarchical identifier and its paired base identifier match an existing hierarchical/base identifier pair, the compiler determines that the hierarchical/base identifier pair are not unique. If the selected hierarchical identifier and its paired base identifier do not match an existing hierarchical/base identifier pair, the compiler determines that the hierarchical/base identifier pair are unique. In some implementations, the compiler may remove the base identifier that is paired with the selected hierarchical identifier from a list of identifiers to be processed or may indicate that the base identifier has already been processed so that the base identifier is not processed again in the operations beginning at block 304.

If the compiler determines that the hierarchical identifier is not paired with a base identifier at block 308 or if the compiler determines that the hierarchical/base identifier pair is not unique at block 312, the compiler triggers an identifier syntax error message (314). The identifier syntax error message or signal indicates that the selected identifier is improperly implemented in the HTML code, i.e. use of the selected identifier fails to comply with a syntax rule. The compiler may indicate information in the error such as the selected identifier, its location in the code, the syntax rule which was violated, an element associated with the selected identifier, etc. For example, the compiler may indicate that the selected hierarchical identifier is not paired with a base identifier and may identify the element associated with the selected identifier. As an additional example, the compiler may indicate that the hierarchical/base identifier pair is not unique and may identify the element associated with the selected identifier and the element containing the similar hierarchical/base identifier pair.

If the compiler determines at block 306 that the selected identifier is a base identifier, the compiler determines whether the base identifier is paired with a parent identifier (310). The compiler makes this determination in a manner similar to that described at block 308.

If the compiler determines that the selected base identifier was not paired with a parent identifier at block 310, the compiler determines whether the base identifier is unique (316). Since the base identifier is not paired with a hierarchical identifier, the base identifier need not be unique in comparison to other hierarchical identifiers in the code, as hierarchical identifier attributes are distinguishable from base identifier attributes. However, the base identifier should be unique in comparison to other base identifiers in the code including base identifiers that are paired with hierarchical identifiers. The compiler may compare the selected base identifier to other base identifiers that have been previously processed. If the selected base identifier matches a previously processed identifier, the compiler determines that the base identifier is not unique. If the selected base identifier does not match a previously processed identifier, the compiler determines that the base identifier is unique.

If the compiler determines that the base identifier is not unique, the compiler triggers a non-unique base identifier syntax error message (318). Similar to the error triggered at block 314, the non-unique base identifier syntax error message indicates that the selected identifier is improperly implemented in the HTML code. The compiler may indicate in the error that the selected base identifier is not unique and may identify the element which contains the similar base identifier.

After performing the operations described at block 310, 312, 314, 316, or 318, the compiler determines whether there is an additional identifier (320). If there is an additional identifier, the compiler selects the additional identifier at block 304. If there is not an additional identifier, the process ends. In some implementations, the compiler may stop processing identifiers after an error is triggered at either block 314 or block 318 to allow the error to be resolved. Alternatively, the compiler may complete processing and display triggered errors upon completion.

Figure 4:
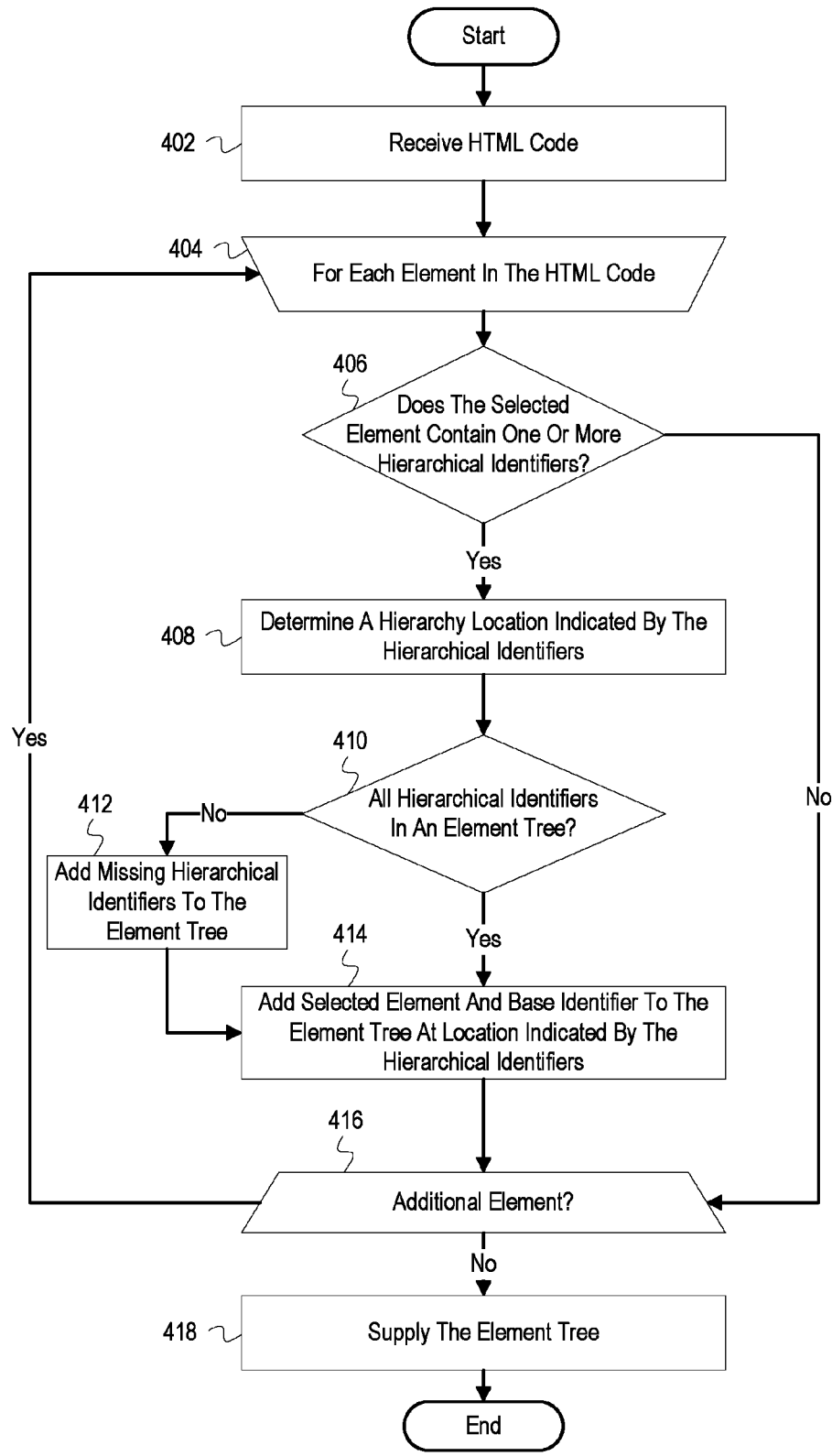
FIG. 4 depicts a flowchart that illustrates example operations for generating an element tree.

FIG. 4 depicts a flowchart that illustrates example operations for generating an element tree. The operations are described below as being performed by an element hierarchy analyzer, such as the element hierarchy analyzer 103 of FIG. 1. The operations may also be performed by a rendering engine of a web browser, a debugger, a compiler, an integrated development environment or components thereof, etc.

The element hierarchy analyzer ("analyzer") receives HTML code (402). The analyzer may receive the HTML code in a manner similar to that of the compiler at block 302 of FIG. 3. Additionally, in some instances, the analyzer may receive the code from a user that wishes to analyze the hierarchical relationships of elements in the HTML code.

The analyzer begins operations for each element in the code (404). The analyzer may iterate over each element by identifying known HTML element tags, traversing a parse tree or an array of tokens generated with the code, or searching for a specified character such as the "<" character which indicates the beginning of an element. The element currently being iterated over is hereinafter referred to as the selected element.

The analyzer determines whether the selected element contains hierarchical identifiers (406). The analyzer may parse the attributes in the selected element, traverse a portion of a parse tree related to the selected element, search an array of tokens, etc., in order to identify any hierarchical identifier attributes.

If the analyzer determines that the selected element contains hierarchical identifiers, the analyzer determines a hierarchy location indicated by the hierarchical identifiers (408). The analyzer may determine the hierarchical location or position for the selected element based on the keys for the hierarchical identifier attributes. The hierarchical location for the element includes at least a level in the hierarchy and identification of an immediate parent element or identifier. The level in the hierarchy may be indicated by a largest number associated with a hierarchical identifier attribute key. For example, as illustrated in FIG. 2, if an element has one hierarchical identifier attribute key of "id1", this indicates that the element is located one level down in the hierarchy. If an element has hierarchical identifier attribute keys of "id1" and "id2", this indicates that the element is located two levels down in the hierarchy, as the largest number associated with a hierarchical identifier attribute key is 2. To determine the parent element or identifier, the analyzer determines the hierarchical identifier that is associated with the largest numbered hierarchical identifier attribute key. In some implementations, a hierarchical identifier value may indicate the hierarchical location instead of the key. For example, the hierarchical identifier may include a number similar to the attribute key described above such as "example 3", where "3" corresponds to the hierarchy level.

The analyzer determines whether all hierarchical identifiers in the selected element are in an element tree (410). The element tree is a data structure that represents a hierarchical tree structure. The element tree may include a number of root nodes and children nodes including children leaf nodes. The nodes of the element tree indicate elements that are located based on their hierarchical identifiers. The nodes may include information such as a base identifier associated with the element. In some instances, a node may indicate an identifier that is not associated with an element but is used to group child elements at a location in the hierarchy.

The analyzer determines whether the hierarchical identifiers in the selected element are in the element tree by searching the element tree with each of the hierarchical identifiers. The analyzer may first determine which hierarchy level is indicated by the hierarchical identifier or its attribute key and search that level of the element tree for the hierarchical identifier. For example, if the attribute key is "id1", the analyzer searches the root level of the element tree. If the analyzer discovers each of the hierarchical identifiers in the element tree, the analyzer determines that all of the hierarchical identifiers are in the element tree. If the analyzer does not find each of the hierarchical identifiers in the element tree, the analyzer determines that there are hierarchical identifiers missing from the element tree.

If the analyzer determines at block 410 that not all of the hierarchical identifiers are in the element tree, the analyzer adds the missing hierarchical identifiers to the element tree (412). The analyzer adds a missing hierarchical identifier to the element tree by inserting a node to represent the hierarchical identifier in the element tree. As other elements are processed, the analyzer may also identify an element whose base identifier corresponds to the hierarchical identifier and associate the element with the inserted node. The node is inserted at the location indicated by the missing hierarchical identifier. The location is determined in a manner similar to that described at block 408.

After the analyzer adds the missing hierarchical identifiers to the element tree at block 412 or if the analyzer determines at block 410 that all hierarchical elements are in the element tree, the analyzer adds the selected element to the element tree at the location indicated by the hierarchical identifiers (414). The analyzer may first insert a node in the element tree at the location determined at block 408. The analyzer then populates or associates the node with information such as the base identifier for the element, the type of element, or information related to attributes or data associated with the element. For example, the node may indicate that the element is a hyperlink element and may include the hyperlink or URL value.

After adding the selected element to the element tree, the analyzer determines if there is an additional element in the code (416). If there is an additional element, the analyzer selects the additional element at block 404.

If the analyzer determines there are no additional elements in the HTML code, the analyzer supplies the element tree (418). The element tree or a portion of the element tree may be supplied or provided to a user or programmer, an application such as a web browser or web page editor, a JavaScript function, or other process. For example, a function may request a portion of the element tree corresponding to a specified identifier. The element tree portion may include the node associated with the specified identifier and any children nodes. The element tree may also be provided for analysis so that elements may be quickly retrieved or referenced based on hierarchical location. Without the element tree, the hierarchical identifiers in the code may need to be processed and analyzed each time a request to retrieve elements based on hierarchical location is received. With the element tree, the elements corresponding to the desired hierarchical location can be retrieved without re-processing the code as the elements may be retrieved through traversal of the element tree. After the element tree has been supplied, the process ends.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 410 and 412 of FIG. 4 can be performed in parallel or concurrently. Additionally, the operations depicted in blocks 314 or 318 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as identifiers and elements. In some implementations, elements and identifiers may be iterated through according to an ordering of the elements or identifiers in code, in a random order, in reverse order, etc. Also, the number of iterations for loop operations may vary. Different techniques for processing elements and identifiers may require fewer iterations or more iterations. For example, identifiers may be processed in parallel, reducing the number of iterations. Additionally, a loop may not iterate for each element or identifier. For example, elements without any identifiers or without hierarchical identifiers may be ignored in various implementations.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
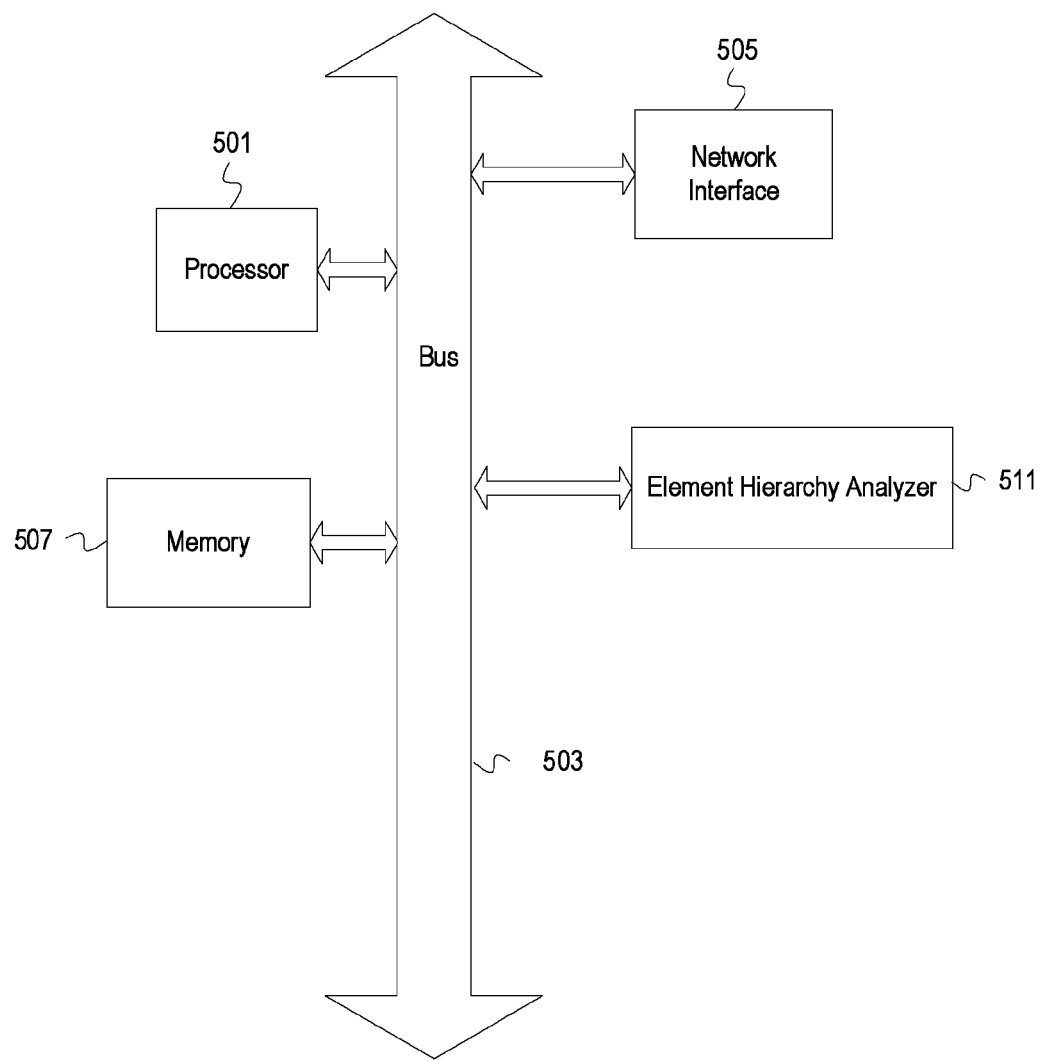
FIG. 5 depicts an example computer system with an element hierarchy analyzer.

FIG. 5 depicts an example computer system with an element hierarchy analyzer. The computer system includes a processor 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface, SONET interface, wireless interface, etc.). The system also includes an element hierarchy analyzer 511. The element hierarchy analyzer 511 processed code to ensure that hierarchical identifiers conform to syntax rules and generates an element tree based on the hierarchical identifiers. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for indicating an element hierarchy as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
    based on receipt of program code which comprises a plurality of elements, for each element of the plurality of elements,
        identifying a plurality of identifiers associated with the element;
        determining that the plurality of identifiers comprises a set of one or more hierarchical identifiers;
        based on determining that the plurality of identifiers comprises the set of one or more hierarchical identifiers,
            determining a hierarchical relationship for the element based, at least in part, on the set of one or more hierarchical identifiers; and
            indicating in an element tree the hierarchical relationship of the element relative to other elements of the plurality of elements indicated in the element tree, wherein a location of the element within the element tree is independent of the element's location within the program code;
    based on receipt of a request indicating a first hierarchical identifier,
        traversing the element tree to identify elements of the plurality of elements associated with the first hierarchical identifier; and
        providing the elements associated with the first hierarchical identifier in response to the request.

2. The method of claim 1, further comprising, for each element of the plurality of elements, determining that the plurality of identifiers complies with a syntax rule, wherein determining that the plurality of identifiers complies with the syntax rule comprises:
    determining that a second hierarchical identifier of the set of one or more hierarchical identifiers is paired with a first identifier of the plurality of identifiers; and
    determining that the second hierarchical identifier and the first identifier are combinatorially unique among other combinations of the plurality of identifiers associated with each of the plurality of elements.

3. The method of claim 2, further comprising, based on a determination that at least one of the plurality of identifiers fails to comply with the syntax rule, indicating a syntax rule error.

4. The method of claim 1, wherein traversing the element tree to identify elements of the plurality of elements associated with the first hierarchical identifier comprises:
   traversing the element tree to find a first node corresponding to the first hierarchical identifier; and
   indicating children elements of the first node in the element tree as the elements associated with the first hierarchical identifier.

5. The method of claim 1, further comprising:
   generating a graphical depiction of the element tree that shows the hierarchical relationships among the plurality of elements; and
   providing the graphical depiction for display.

6. The method of claim 1, wherein determining the hierarchical relationship for the element based, at least in part, on the set of one or more hierarchical identifiers comprises:
   identifying a set of hierarchical identifiers among the plurality of identifiers, wherein each of the set of hierarchical identifiers corresponds to a node in the element tree; and
   determining a location for the element in the element tree based, at least in part, on the set of hierarchical identifiers and the one or more hierarchical identifiers associated with the element.

7. The method of claim 6, wherein indicating in the element tree the hierarchical relationship of the element relative to the other elements of the plurality of elements indicated in the element tree comprises adding the element as a node in the element tree at a location corresponding to the determined hierarchical relationship.

8. The method of claim 1, wherein the program code comprises HyperText Markup Language code.

9. One or more non-transitory machine-readable storage media having first program code stored therein for determining hierarchical relationships across elements of a program code, the first program code instructions comprising instructions to:
   based on receipt of second program code which comprises a plurality of elements, for each element of the plurality of elements,
      identify a plurality of identifiers associated with the element;
      determine whether the plurality of identifiers comprises a set of one or more hierarchical identifiers;
      based on a determination that the plurality of identifiers comprises a set of one or more hierarchical identifiers,
         determine a hierarchical relationship for the element based, at least in part, on the set of one or more hierarchical identifiers; and
         indicate in an element tree the hierarchical relationship of the element relative to other elements of the plurality elements indicated in the element tree, wherein a location of the element within the element tree is independent of the element's location within the second program code; and
   based on receipt of a request that indicates a first hierarchical identifier,
      traverse the element tree to identify elements of the plurality of elements associated with the first hierarchical identifier; and
      provide the elements associated with the first hierarchical identifier in response to the request.

10. The machine-readable storage media of claim 9, further comprising instructions to, for each element of the plurality of elements, determine whether the plurality of identifiers complies with a syntax rule, wherein the instructions to determine whether the plurality of identifiers complies with the syntax rule comprise instructions to:
   determine whether a second hierarchical identifier of the set of one or more hierarchical identifiers is paired with a first identifier of the plurality of identifiers; and
   determine whether the second hierarchical identifier and the first identifier are combinatorially unique among other combinations of the plurality of identifiers associated with each of the plurality of elements.

11. The machine-readable storage media of claim 9, wherein the instructions to determine the hierarchical relationship for the element based, at least in part, on the set of one or more hierarchical identifiers comprise instructions to:
   identify a set of hierarchical identifiers among the plurality of identifiers, wherein each of the set of hierarchical identifiers corresponds to a node in the element tree; and
   determine a location for the element in the element tree based, at least in part, on the set of hierarchical identifiers and the one or more hierarchical identifiers associated with the element.

12. The machine-readable storage media of claim 11, wherein the instructions to indicate in the element tree the hierarchical relationship of the element relative to the other elements of the plurality of elements indicated in the element tree comprise instructions to add the element as a node in the element tree at a location corresponding to the determined hierarchical relationship.

13. An apparatus comprising:
   a processor; and
   a machine-readable medium having instructions executable by the processor to cause the apparatus to,
      based on receipt of first program code which comprises a plurality of elements, for each element of the plurality of elements,
         identify a plurality of identifiers associated with the element;
         determine whether the plurality of identifiers comprises a set of one or more hierarchical identifiers;
         based on a determination that the plurality of identifiers comprises a set of one or more hierarchical identifiers,
            determine a hierarchical relationship for the element based, at least in part, on the set of one or more hierarchical identifiers; and
            indicate in an element tree the hierarchical relationship of the element relative to other elements of the plurality elements indicated in the element tree, wherein a location of the element within the element tree is independent of the element's location within the first program code; and
      based on a receipt of a request that indicates a first hierarchical identifier, traverse the element tree to identify elements of the plurality of elements associated with the first hierarchical identifier; and
         provide the elements associated with the first hierarchical identifier in response to the request.

14. The apparatus of claim 13, further comprising instructions executable by the processor to cause the apparatus to, for each of the plurality of elements, determine whether the plurality of identifiers complies with a syntax rule, wherein the program code executable by the processor to cause the apparatus to determine whether the plurality of identifiers complies with the syntax rule comprises:

determine whether a second hierarchical identifier of the set of one or more hierarchical identifiers is paired with a first identifier of the plurality of identifiers; and determine whether the second hierarchical identifier and the first identifier are combinatorially unique among other combinations of the plurality of identifiers associated with each of the plurality of elements.

15. The apparatus of claim 14, further comprising instructions executable by the processor to cause the apparatus to, based on a determination that at least one of the plurality of identifiers fails to comply with the syntax rule, indicate a syntax rule error.

16. The apparatus of claim 13, wherein the instructions executable by the processor to cause the apparatus to traverse the element tree to identify elements of the plurality of elements associated with the first hierarchical identifier comprise instructions executable by the processor to cause the apparatus to:

traverse the element tree to find a first node corresponding to the first hierarchical identifier; and indicate children elements of the first node in the element tree as the elements associated with the first hierarchical identifier.

17. The apparatus of claim 13, further comprising instructions executable by the processor to cause the apparatus to:

generate a graphical depiction of the element tree that shows the hierarchical relationships among the plurality of elements; and provide the graphical depiction for display.

18. The apparatus of claim 13, wherein the instructions executable by the processor to cause the apparatus to determine the hierarchical relationship for the element based, at least in part, on the set of one or more hierarchical identifiers comprise instructions executable by the processor to cause the apparatus to:

identify a set of hierarchical identifiers among the plurality of identifiers associated with each of the plurality of elements, wherein each of the set of hierarchical identifiers corresponds to a node in the element tree; and determine a location for the element in the element tree based, at least in part, on the set of hierarchical identifiers and the one or more hierarchical identifiers associated with the element.

19. The apparatus of claim 18, wherein the instructions executable by the processor to cause the apparatus to indicate in the element tree the hierarchical relationship of the element relative to the other elements of the plurality of elements indicated in the element tree comprise instructions executable by the processor to cause the apparatus to add the element as a node in the element tree at a location corresponding to the determined hierarchical relationship.

20. The apparatus of claim 13, wherein the first program code comprises HyperText Markup Language code.

* * * * *